United States Patent
Sugioka et al.

(10) Patent No.: US 10,744,906 B2
(45) Date of Patent: Aug. 18, 2020

(54) SYSTEM AND METHOD FOR SEAT RETRACTION DURING AN AUTONOMOUS DRIVING MODE

(71) Applicant: VOLVO CAR CORPORATION, Gothenburg (SE)

(72) Inventors: Ichiro Sugioka, Newbury Park, CA (US); John Downs, Simi Valley, CA (US); Andreas Zinn, Thousand Oaks, CA (US); Douglas Hall Frasher, Newbury Park, CA (US)

(73) Assignee: VOLVO CAR CORPORATION, Gothenburg (SE)

( * ) Notice: Subject to any disclaimer, the term of this patent is extended or adjusted under 35 U.S.C. 154(b) by 926 days.

(21) Appl. No.: 14/857,092

(22) Filed: Sep. 17, 2015

(65) Prior Publication Data

US 2016/0082867 A1    Mar. 24, 2016

(30) Foreign Application Priority Data

Sep. 24, 2014 (EP) .................................. 14186155

(51) Int. Cl.
*B60N 2/90* (2018.01)
*B60N 2/04* (2006.01)
(Continued)

(52) U.S. Cl.
CPC ............. *B60N 2/04* (2013.01); *B60N 2/0244* (2013.01); *B60N 2/06* (2013.01); *B60N 2/919* (2018.02); *B60N 2002/924* (2018.02)

(58) Field of Classification Search
None
See application file for complete search history.

(56) References Cited

U.S. PATENT DOCUMENTS

| 4,797,824 A | 1/1989 | Sugiyama et al. |
| 6,240,352 B1 * | 5/2001 | McCurdy ............... B60N 2/002 280/735 |

(Continued)

FOREIGN PATENT DOCUMENTS

| CN | 101076466 A | 11/2007 |
| CN | 102328605 A | 1/2012 |

(Continued)

OTHER PUBLICATIONS

Extended European Search Report Dated Mar. 31, 2015, Application No. 14186155.9-1758, Applicant Volvo Car Corporation, 5 Pages.

(Continued)

*Primary Examiner* — Thomas G Black
*Assistant Examiner* — Demetra R Smith-Stewart
(74) *Attorney, Agent, or Firm* — Brooks Kushman P.C.

(57) ABSTRACT

Example embodiments presented herein are directed toward a seat assembly, and corresponding method, for seat retraction in a vehicle during an autonomous driving mode. Seat refraction is provided by detecting a user initiated input for the retraction. Thereafter, a front seat is refracted such that an occupant of the front seat is out of reach of at least one driving control input device, for example, a steering wheel, pedals or a gear shift, during an autonomous driving mode. Such seat retraction prevents the occupant from providing inadvertent driving inputs to the driving control input devices during the autonomous driving mode.

19 Claims, 5 Drawing Sheets

(51) Int. Cl.
*B60N 2/02* (2006.01)
*B60N 2/06* (2006.01)

(56) References Cited

U.S. PATENT DOCUMENTS

| | | | |
|---|---|---|---|
| 8,145,388 B2 | 3/2012 | Kusunoki | |
| 8,565,997 B2 | 10/2013 | Kindo et al. | |
| 8,864,232 B2 | 10/2014 | Hashimoto | |
| 9,073,574 B2* | 7/2015 | Cuddihy | B62D 1/183 |
| 9,096,150 B2* | 8/2015 | Cuddihy | B60N 2/143 |
| 9,108,584 B2* | 8/2015 | Rao | B60R 21/017 |
| 9,199,553 B2* | 12/2015 | Cuddihy | B60N 2/005 |
| 9,227,531 B2* | 1/2016 | Cuddihy | B60N 2/203 |
| 9,304,513 B2 | 4/2016 | Ichikawa et al. | |
| 9,340,126 B2* | 5/2016 | Cuddihy | B60N 2/143 |
| 9,463,760 B2* | 10/2016 | Choi | B60R 21/013 |
| 9,738,179 B2* | 8/2017 | Ebina | B60N 2/0244 |
| 9,908,440 B2* | 3/2018 | Sugioka | B60R 16/037 |
| 2011/0285186 A1 | 11/2011 | Demmelmeier et al. | |
| 2014/0142245 A1 | 5/2014 | Cai et al. | |
| 2015/0142245 A1* | 5/2015 | Cuddihy | B60N 2/143 701/23 |
| 2015/0158486 A1* | 6/2015 | Healey | B60W 30/12 701/23 |
| 2015/0258954 A1* | 9/2015 | Engelman | B60R 21/013 280/735 |
| 2015/0258955 A1* | 9/2015 | Jayasuriya | B60R 22/023 297/353 |
| 2016/0027307 A1* | 1/2016 | Abhyanker | G08G 1/005 701/117 |
| 2016/0082867 A1 | 3/2016 | Sugioka et al. | |
| 2016/0159251 A1 | 6/2016 | Ebina et al. | |
| 2017/0217335 A1* | 8/2017 | Tominaga | B60N 2/0228 |
| 2017/0267126 A1* | 9/2017 | Reuschel | B60N 2/074 |
| 2018/0126876 A1* | 5/2018 | Takamatsu | B60N 2/10 |

FOREIGN PATENT DOCUMENTS

| | | |
|---|---|---|
| CN | 102939230 A | 2/2013 |
| CN | 103818380 A | 5/2014 |
| CN | 105579321 A | 5/2016 |
| DE | 4226747 C1 | 12/1993 |
| DE | 102006006995 A1 | 8/2007 |
| DE | 102008057861 A1 | 5/2010 |
| EP | 2392501 A2 | 12/2011 |
| EP | 2840000 A2 | 2/2015 |
| JP | S 60-158809 A | 8/1985 |
| WO | 2014015990 A1 | 1/2014 |
| WO | 2015011866 A1 | 1/2015 |
| WO | WO-2015132119 A1 * | 9/2015 |

OTHER PUBLICATIONS

Chinese Office Action Dated Sep. 28, 2018, Application No. 201510590418.7, Applicant Volvo Car Corporation, 9 pages.
DE4226747C1, Abstract & Machine Translation.
DE102006006995A1, Abstract & Machine Translation.
EP2392501A2, Abstract & Machine Translation.
EP2840000A2, Abstract & Machine Translation.
WO2014015990A1, Abstract & Machine Translation.
WO2015011866A1, Abstract & Machine Translation.

* cited by examiner

SYSTEM AND METHOD FOR SEAT RETRACTION DURING AN AUTONOMOUS DRIVING MODE

CROSS-REFERENCE TO RELATED APPLICATIONS

This application claims foreign priority benefits under 35 U.S.C. § 119(a)-(d) to European patent application number EP 14186155.9, filed Sep. 24, 2014, which is incorporated by reference in its entirety.

TECHNICAL FIELD

Example embodiments presented herein are directed towards a system, and corresponding method therein, for seat retraction in a vehicle during an autonomous driving mode.

BACKGROUND

An autonomous vehicle is one which is capable of sensing its environment and navigating without the use of human input. It is envisioned that such vehicles will be capable of transitioning from an autonomous driving mode and a manual driving mode, in which a driver manually operates the vehicle. It is further envisioned that such autonomous driving may only be allowed on preapproved or certified roads or zones.

It should be appreciated that the functionality of a vehicle will differ during an autonomous driving mode and a manual driving mode. Furthermore, during the different driving modes of a vehicle, different safety precautions will be needed. In particular, during an autonomous driving mode, precautions are needed in order to prevent an inadvertent driving input to affect the autonomous driving. For example, a driver of a vehicle may accidently engage the steering wheel or the foot pedals during the autonomous driving mode. To account for this problem, many car manufactures disengage the steering wheel and foot pedals such that if an inadvertent driving input were to be applied, the input would have no effect during the autonomous driving mode.

SUMMARY

An important aspect of autonomous driving is the ability to transition back to a manual driving mode quickly. Such a transition may be necessary in the presence of an imminent accident or an expected end of a certified road or zone in which a driver will need to take immediate control of the car. Furthermore, transitions between a manual driving mode and an autonomous driving mode may be required if the driver senses a problem that requires over-riding the autonomous driving mode. The disengaging of driving inputs, for example, the steering wheel, foot pedals and/or gear shift, increases the transitioning time as these devices will have to be re-engaged. Furthermore, disengaging such devices presents a possible operational failure if such re-engaging is not successful or will not be affected in the event of a system failure where a driver override may become necessary.

Thus, at least one example object of some of the example embodiments presented herein is to provide a means for avoiding inadvertent driving inputs during an autonomous driving mode in an efficient and effective manner. According to some of the example embodiments, this object may be satisfied by moving a front seat occupant of a vehicle away from a driving input device during an autonomous driving mode. An example advantage of moving the front seat occupant away from the driving inputs is that such driving controls may remain engaged during the autonomous driving mode. Leaving the driving controls engaged during the autonomous driving mode will decreases the driving mode transitions times as well as decrease the possibilities of operational failures as discussed above.

Accordingly, some of the example embodiments are directed towards a method for seat retraction in a vehicle during an autonomous driving mode. The method comprises detecting a user initiated command for seat retraction. The method further comprises retracting a front seat in a direction towards a rear end of the vehicle such that an occupant of the front seat is out of reach of at least one driving control input device of the vehicle during an autonomous driving mode. It should be appreciated that the at least one driving control input device may be a steering wheel, foot pedals and/or a gear shift. It should further be appreciated that the front seat and the occupant may refer to the driver and/or passenger of the vehicle.

Some of the example embodiments are directed towards, a seat assembly for refracting a front seat in a vehicle during an autonomous driving mode. The seat assembly comprises a control unit configured to detect a user initiated command for seat retraction. The seat assembly further comprises a front seat configured to slide along at least one rail. The at least one rail is connectable to a floor surface of the vehicle. The front seat is further configured to retract in a direction towards a rear end of the vehicle along the at least one rail such that an occupant of the front seat is out of reach of at least one driving control input device of the vehicle during an autonomous driving mode.

Some of the example embodiments are directed towards a computer readable medium comprising program instructions for seat retraction in a vehicle during an autonomous driving mode. Execution of the program instructions by one or more processors of a computer system causes the one or more processors to carry out the steps of detecting a user initiated command for seat refraction, and refracting a front seat in a direction towards a rear end of the vehicle such that an occupant of the front seat is out of reach of a steering wheel and foot pedals of the vehicle during an autonomous driving mode.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

During an autonomous driving mode, a front seat occupant may accidently come into contact with a driving control input device and inadvertently provide a driving input to the device. Examples of a driving control input device are a steering wheel, foot pedals and/or a gear shift. In order to remedy this problem, many manufactures disengage the driving control input devices when the vehicle enters the autonomous driving mode. However, the disengaging of the driving control input devices increases the time which is needed to transition the vehicle from an autonomous driving mode to a manual driving mode. Furthermore, the disengaging of the driving control inputs presents the possibility of an operational failure as the re-engaging of the driving control inputs during a manual driving mode may not be successful or will not be affected in the event of a system failure where a driver override may become necessary.

Accordingly, some of the example embodiments presented herein are directed towards an efficient and effective means of retracting a front seat of a vehicle in order to avoid inadvertent inputs to a driving control input device during an autonomous driving mode. It should be appreciated that the example embodiments presented herein may apply to any front seat of a vehicle, for example, the driver seat and/or the front passenger seat.

Figure 1:
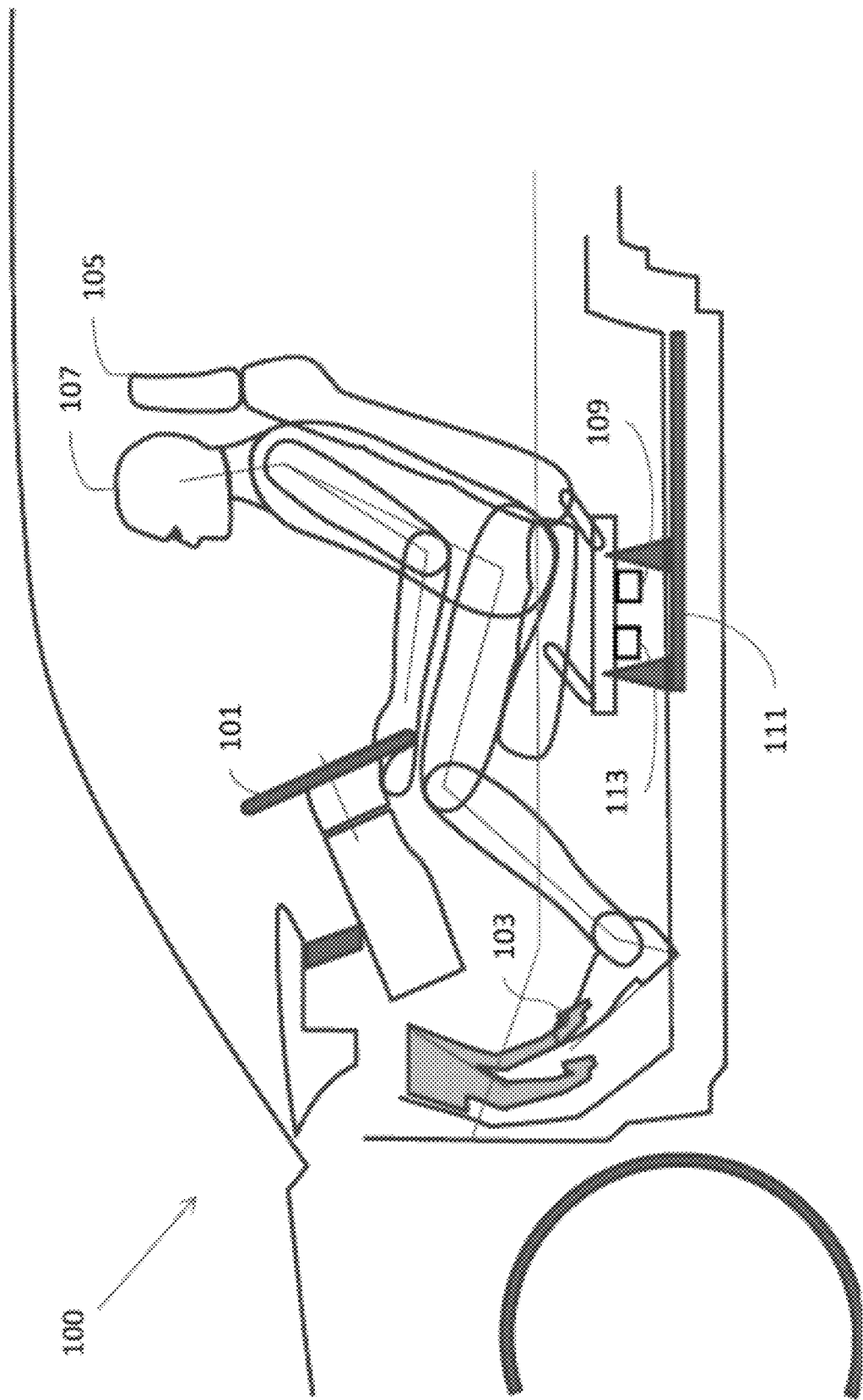
FIG. 1 is a schematic of a seat assembly featuring a front seat in a forward or initial driving position, according to some of the example embodiments.

FIG. 1 illustrates a cross-sectional view of a vehicle 100 according to some of the example embodiments. The vehicle 100 comprises a number of driving control input devices, such as a steering wheel 101, foot pedals 103 and a gear shift (not illustrated). In a manual driving mode, a front seat 105 is situated such that an occupant 107 is in reach of the driving input devices, for example, the steering wheel 101 and the foot pedals 103, as illustrated in FIG. 1, or the gear shift.

During operation, the vehicle will transition into an autonomous driving mode. During such a transition, a front seat occupant 107 is provided with an option of retracting the front seat 105. According to some of the example embodiments, the vehicle may provide the front seat occupant 107 with an audio and/or visual indication that seat retraction is possible once the autonomous driving mode is engaged. According to some of the example embodiments, seat refraction may be automatic once the front seat occupant has been provided with the audio and/or visual indication warning the occupant that the seat retraction will occur.

According to some of the example embodiments, the seat retraction will not be automatic and the front seat occupant 107 will be given option to engage the seat retraction so as not to take the occupant 107 by surprise. According to these example embodiments, the front seat occupant 107 may provide a user initiated command to retract the front seat 105. The user initiated command may be in the form of pressing a button, a detected position of the occupant 107 and/or a movement of the occupant 107.

Examples of a detected position or movement for seat retraction may be, for example, the occupant 107 placing his or her hands in a particular manner. For example, the occupant 107 may place their hand in a predetermined position on the seat with an applied force. A further example of a detected position or movement may be in the form of the occupant 107 waving his or her hand in a predetermined manner or pattern for indicating the seat retraction. It should be appreciated that such positions or movements are non-limiting examples and any other detectable positions or movements may be employed for identifying a user initiated command for seat refraction. It should be appreciated that the identification of a position or movement for initiating seat refraction may be provided by any number and any type of sensors in the vehicle. Non-limiting examples of such sensors may be camera, infrared sensors, weight and/or pressure sensors, ultrasound distance sensors, etc. Non-limiting examples of the placement of such sensors may be the front seat, on the vehicle floor, on any of the driving input devices, the vehicle ceiling, etc.

Figure 2:
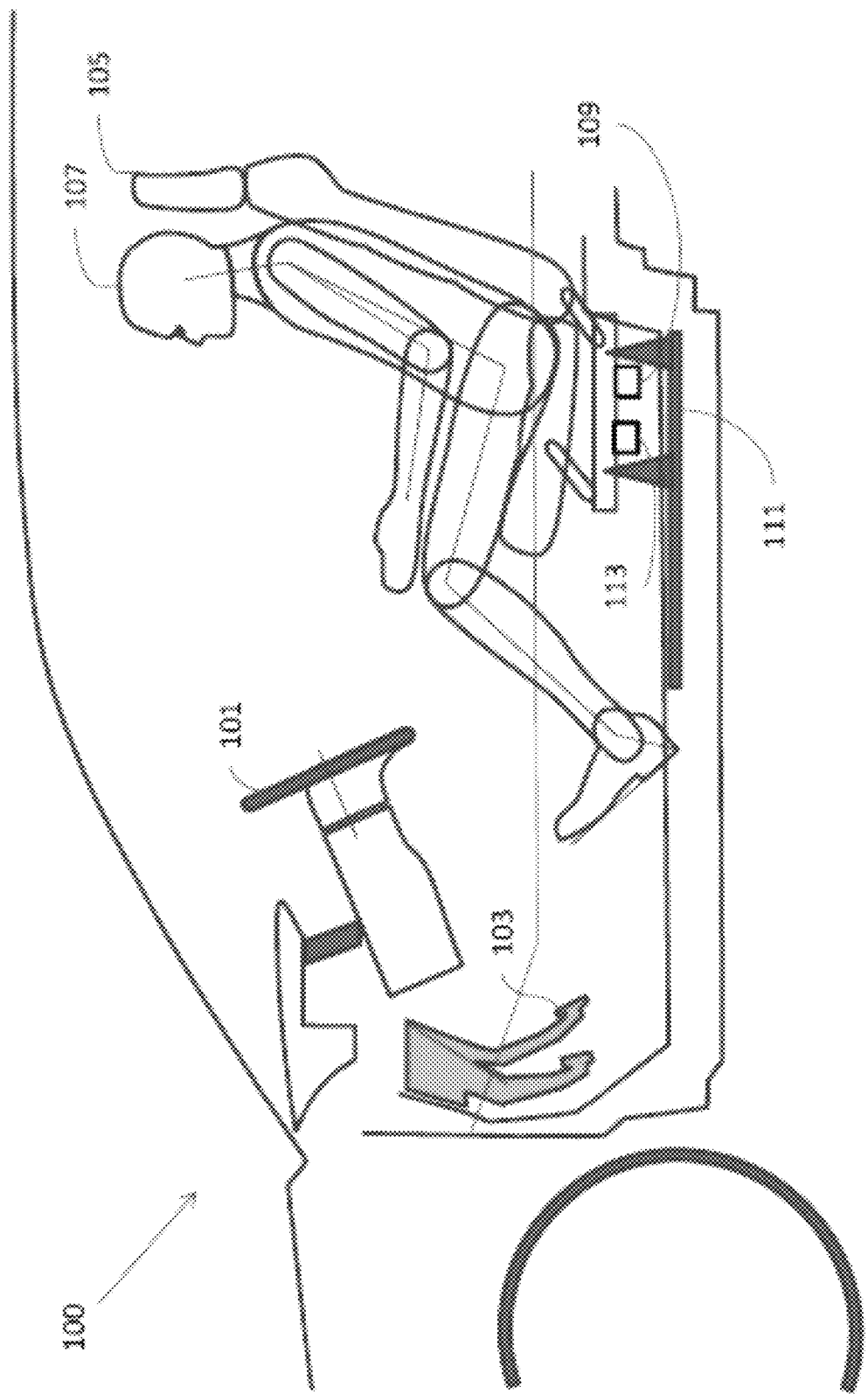
FIG. 2 is a schematic of a seat assembly featuring a front seat in a retracted position during an autonomous driving mode, according to some of the example embodiments.

Once it has been detected that seat retraction will occur, a control unit 109 will initiate a movement of the front seat 105 in a direction towards a rear end of the vehicle, as illustrated in FIG. 2. As one skilled in the art would understand, the control unit 109 may include suitable hardware and/or software, such as one or more processors (e.g., one or more microprocessors, microcontrollers and/or programmable digital signal processors) in communication with one or more storage devices or media including computer readable program instructions that are executable by the one or more processors so that the control unit 109 may perform particular algorithms represented by the functions and/or operations described herein. The control unit 109 may also, or instead, include one or more application specific integrated circuits, programmable gate arrays or programmable array logic, programmable logic devices, or digital signal processors. As one skilled in the art would also understand, the control unit 109 may include, or be in communication with, any number of the above described sensors and/or button. It should be appreciated that the control unit 109 in FIGS. 1 and 2 is situated beneath the front seat 105, however this is merely as an example. The control unit 109 may be situated on any location of the seat, the floor of the vehicle, the instrument panel, or any other location within the vehicle. It should also be appreciated that during the retraction of the front seat 105, the driving input devices may be maintained in an on state such that they are not disengaged during the autonomous driving mode.

During the retraction, the front seat 105 is configured to move or slide along any number of rails 111 that are located on the floor of the vehicle 100. According to some of the example embodiments, the control unit 109 may comprise an actuator 113, or may be in communication with an actuator 113, configured to control a speed of retraction. For example, the actuator may provide a retraction speed that varies during retraction such that the occupant 107 will experience a smooth movement backward rather than jerking motion. According to some of the example embodiments, the actuator 113 may employ an energy absorption function in providing the refraction with a smoothly varying velocity to avoid jerking the occupant that can impart unwanted body movements which may be misunderstood by the occupant sensors.

Figure 3:
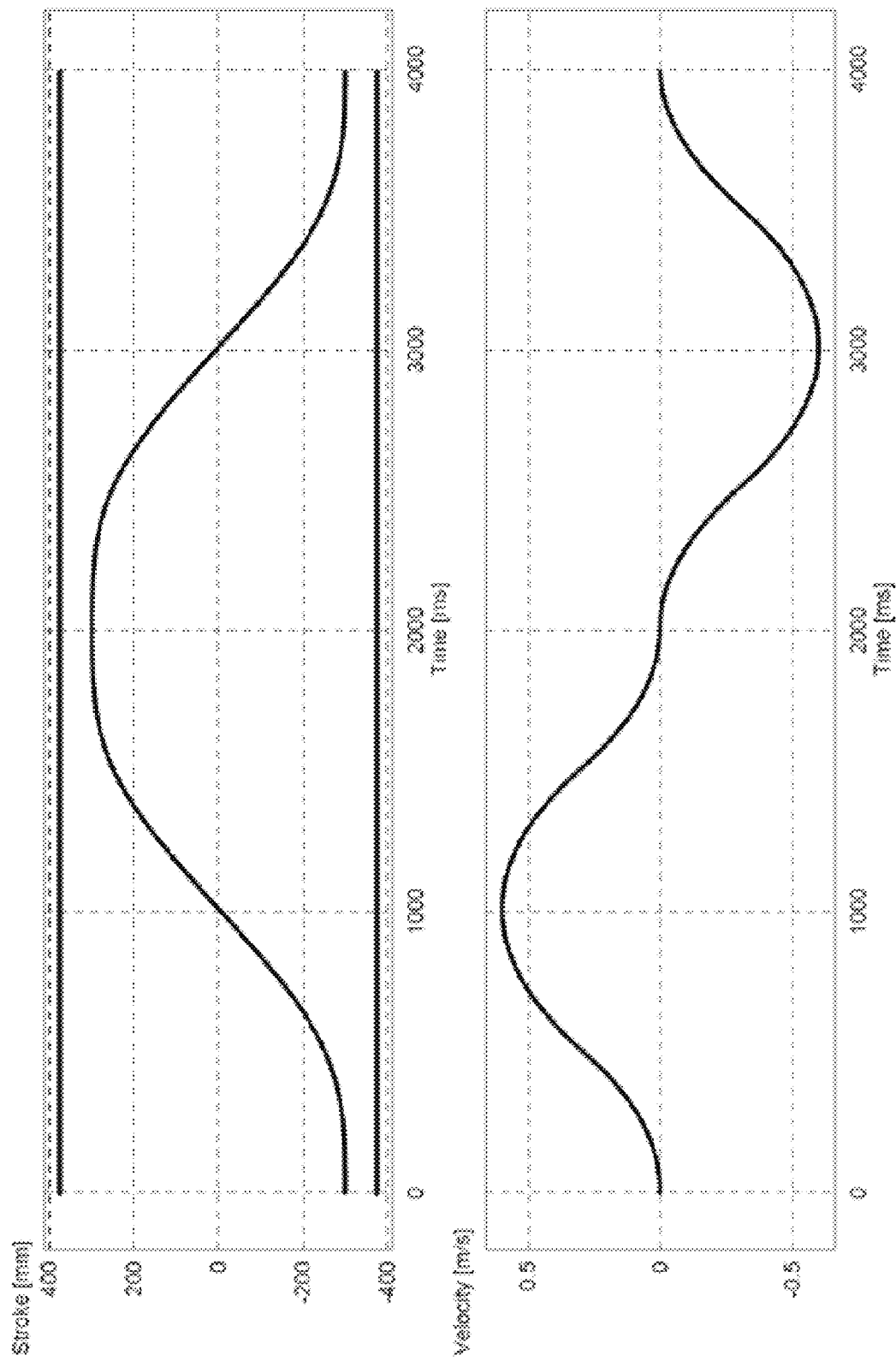
FIG. 3 is a graphical representation of a retraction speed profile, according to some of the example embodiments.

FIG. 3 illustrates a speed profile according to some of the example embodiments. The topmost graph of FIG. 3 illustrates a stroke profile versus time. The vertical axis of the topmost graph represents the distance travelled by the front seat in millimetres (mm) and the horizontal distance represents time in milliseconds (ms). The time period of 0 ms to 2000 ms represents the retraction of the font seat while the time period of 2000 ms to 4000 ms represents the movement of the front seat in returning to the initial or manual driving position. The bottommost graph represents the velocity profile of the seat retraction. The vertical axis of the bottommost graph represents the velocity of the front seat in meters per second (m/s) and the horizontal axis represents time in milliseconds (ms).

During the time period of 0 ms to 2000 ms, representing the retraction of the front seat, the corresponding velocity illustrates a varying velocity featuring a smooth increase in velocity following a smooth decrease in velocity. During the time period of 2000 ms to 4000 ms, representing the front seat returning to the manual drive position, the corresponding velocity also illustrates a varying velocity featuring a smooth increase followed by a decrease. Such a velocity assists in providing a smooth movement for the seat travel. According to some of the example embodiments, specifically when the sensing system determines that the occupant is small in stature, the retraction distances may be less thereby requiring lower velocities and accelerations during the time allotted for the motions.

The control unit 109 is configured to move the front seat 105 a distance such that the occupant 107 will not be within reach of the driving control input devices, for example, the steering wheel 101, the foot pedals 103 or the gear shift. The specific value of this distance will depend on the height of the occupant 105. Furthermore, the distance is largely limited by the clearance behind the front seat, which is usually due to the rear seat or passenger. The distance may exceed 500 mm for large drivers in large cars but it may be desirable to set under 350 mm based on stature in order to maintain the possibility of the front seat occupant to reach the controls with the seat in retracted position in case of a system failure. It should be appreciated that any retraction distance may be adjusted to accommodate driver and/or front seat passenger preferences.

According to some of the example embodiments, the required distance for a specific occupant 105 is determined according to an occupant provided profile. For example, any number of profiles, which comprises occupant height information, may be provided for individuals that are expected to be traveling in the front seat of the vehicle.

According to some of the example embodiments, the required distance is determined based on sensor data. For example, by measuring the seat placement during a manual driving mode, the control unit 109 may provide an estimate on the height of the seat occupant 107.

As a further example, a camera in the instrument panel may be utilized to measure a reach or height of the occupant. Specifically, the occupant torso length may be measured and used to estimate a leg length of the occupant based on statistical or personalized data. Such a camera may be secondary uses in monitoring, for example, driver alertness and driver identification. Another example may comprise cameras located externally from the vehicle which are used to obtain biometric information and the driver approaches the car. Furthermore, any number or type of sensors may provide an estimate of the height of an occupant by measuring, for example, an eye level.

It should also be appreciated that the vehicle may comprise any number of sensors configured to monitor the rearward movement of the font seat. Thus, if an object is detected which may interfere with the retraction of any of the front seats, the seat retraction may be limited accordingly.

The front seat 105 is also configured to return to a forward or initial position, for example, the position which would be utilized in a manual driving mode, as is illustrated in FIG. 1. The control unit 109 may be configured to return the front seat 105 in the initial position. The returning of the front seat may be prompted by a user initiated command or due to an expected end to the autonomous driving mode. Furthermore, the movement back to the manual driving position may also constitute as a method to alert the driver to the task at hand of resuming control of the vehicle. An expected end may be the result of leaving a certificated road or zone for autonomous driving. An expected end to the autonomous driving mode may also comprise the detection of an imminent crash or any other event in which a driver would be required to take control of the vehicle and thus enter a manual driving mode. On specifically controlled roads where autonomous driving will be permitted, monitoring systems are expected to provide a warning time of more than three seconds for any eventuality requiring the driver to take control. The upright seat position will be closer to the airbags and will also optimize the passive safety functions in event of an accident.

Figure 4:
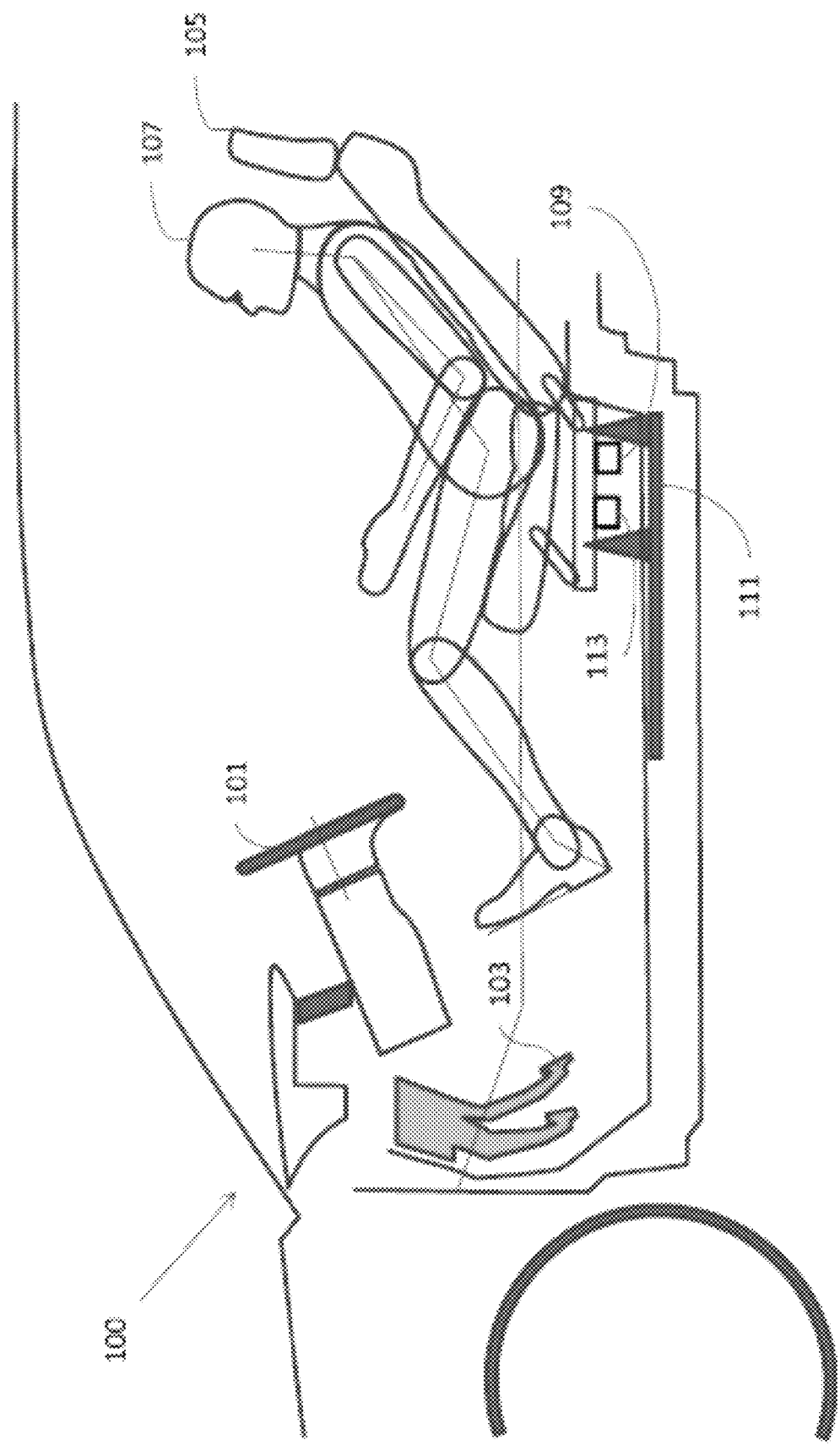
FIG. 4 is a schematic of a seat assembly featuring a front seat in a retracted and reclined position during an autonomous driving mode, according to some of the example embodiments.

According to some of the example embodiments, in addition to the front seat 105 being retracted, the front seat may also be reclined, as illustrated in FIG. 4. The reclining of the front seat 105 further removes the front seat occupant 107 further from any driving control input devices. Additionally, the reclining of the front seat 105 also provides comfort to the front seat occupant during an autonomous driving mode of the vehicle.

Figure 5:
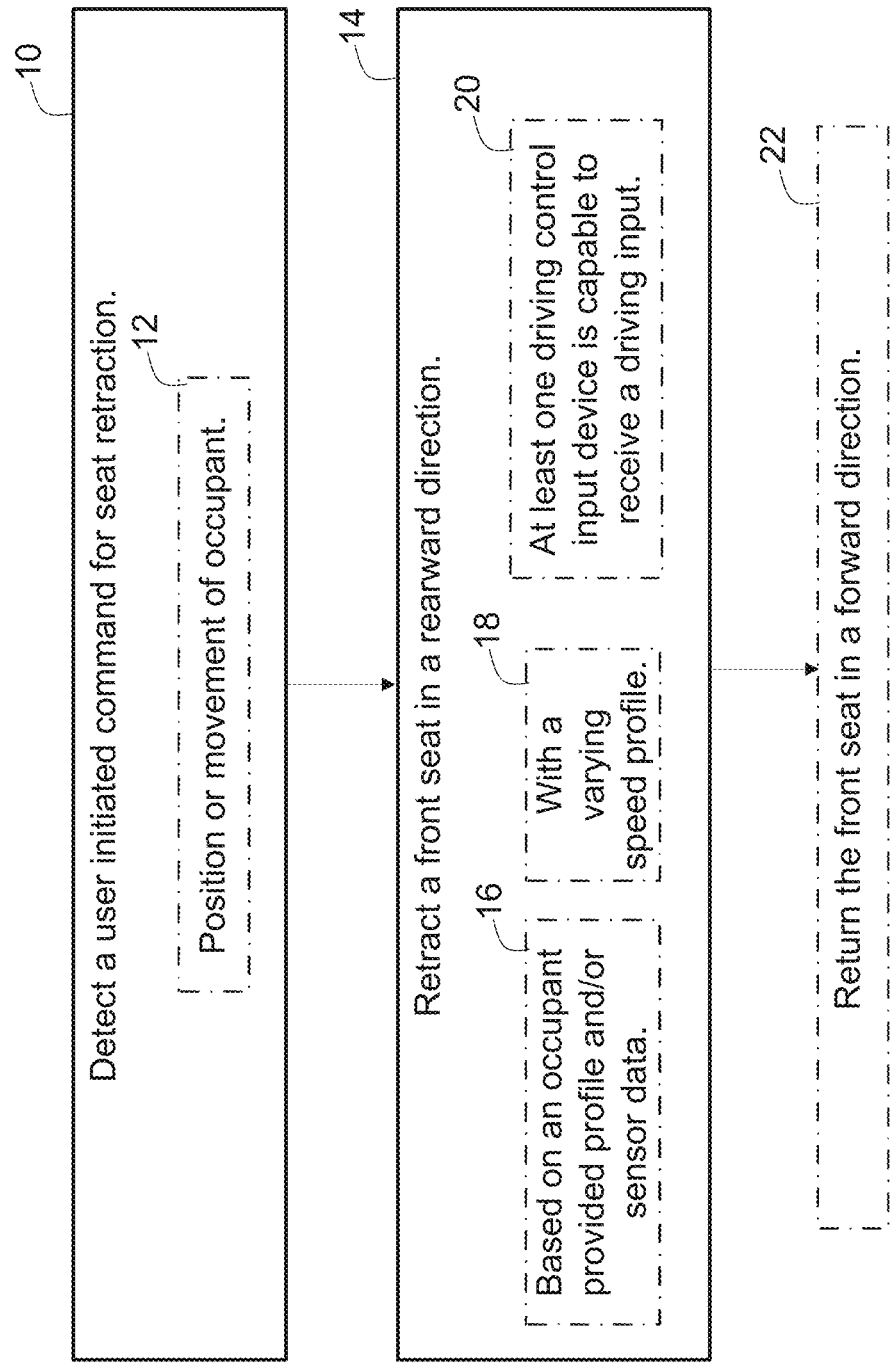
FIG. 5 is a flow diagram depicting example operational steps of the seat assembly of FIGS. 1-4, according to some of the example embodiments.

FIG. 5 is a flow diagram depicting example operations which may be taken by the seat assembly of FIGS. 1, 2 and 4 in the seat retraction in a vehicle during an autonomous driving mode. It should also be appreciated that FIG. 5 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 10

The seat assembly is configured to detect 10 a user initiated command for seat retraction. The control unit 109 is configured to detect the user initiated command for seat retraction.

According to some of the example embodiments, the seat retraction will not be automatic and the front seat occupant 107 will be given option to engage the seat retraction so as not to take the occupant 107 by surprise. According to these example embodiments, the front seat occupant 107 may provide a user initiated command to retract the front seat 105.

Example Operation 12

According to some of the example embodiments, the detecting 10 may further comprise detecting 12 the user initiated command in the form of a position or movement of the occupant. The control unit 109 may be configured to detect the user initiated command in the form of a position or movement.

Examples of a detected position or movement for seat retraction may be, for example, the occupant 107 placing his or her hands in a particular manner. For example, the occupant 107 may place their hand in a predetermined position on the seat with an applied force. A further example of a detected position or movement may be in the form of the occupant 107 waving his or her hand in a predetermined manner or pattern for indicating the seat retraction. It should be appreciated that such positions or movements are non-limiting examples any other detectable positions or movements may be employed for identifying a user initiated command for seat refraction. It should be appreciated that the identification of a position or movement for initiating seat refraction may be provided by any number and any type of sensors in the vehicle. Non-limiting examples of such sensors may be camera, infrared sensors, weight and/or pressure sensors, ultrasound distance sensors, etc. Non-limiting examples of the placement of such sensors may be the front seat, on the vehicle floor, on any of the driving input devices, the vehicle ceiling, etc. It should further be appreciated that the user initiated command may be in the form of pressing a button.

Operation 14

The seat assembly is further configured to retract 14 a front seat 105 in a direction towards a rear end of the vehicle such that an occupant 107 of the front seat 105 is out of reach of at least one driving control input device of the vehicle during an autonomous driving mode. The front seat is configured to slide along at least one rail in order to provide the retraction.

It should be appreciated that the font seat may be a driver or passenger seat. It should further be appreciated that the at least one driving input device may be a steering wheel 101, pedals 103 and/or a gear shift.

Example Operation 16

According to some of the example embodiments, the retracting 14 may further comprise retracting 16 the front seat a distance according to an occupant provided profile and/or sensor data. The distance of refraction is such that the occupant may be out of reach of the at least one driving input device, for example, when the occupant is seated in a typical driving posture such that the occupant's back is against the back of the front seat, as illustrated in FIGS. 1, 2 and 4.

The required distance needed to ensure the occupant is out of reach of the driving input devices will depend on the height of the occupant. Thus, the required distance may be determined based on information provided by the user, for example, via a profile or use history. The required distance may also be provided based on any form of sensing data comprised in the vehicle.

Example Operation 18

According to some of the example embodiments the retracting 14 may further comprise retracting 18 the front seat at a varying speed profile. An actuator 113 may be configured to retract the front seat at a varying speed profile. By providing retraction at a varying speed profile, a smooth backward motion may be provided. According to some of the example embodiments, the actuator 113 may employ an energy absorbing function in an event of a frontal collision as the seat moves forward in a controlled manner from the retracted position.

Example Operation 20

According to some of the example embodiments, the retracting 14 may further comprise maintaining 20 the at least one driving control input device in a state in which the at least one driving control input device is capable to receive a driving input during the retracting 14 of the front seat that overrides the autonomous driving mode of the vehicle. The control unit 109 may be configured to maintain the at least one driving control input device in a state in which the at least one driving control input device is capable to receive the driving input during the retracting of the front seat that overrides the autonomous driving mode of the vehicle.

By maintaining the driving control input devices in an on state, for example, in which the devices may still receive a driving input, the transition time from an autonomous driving mode to a manual driving mode is reduced. Furthermore, leaving the driving input devices in an on state reduces the possibilities of an operational failure in the case in which such devices are not re-engaged properly.

Example Operation 22

According to some of the example embodiments, the seat assembly may be further configured to return 22 the front seat in a forward direction such that the front seat is in an initial position when an end to an autonomous driving mode is expected or upon detection of a user initiated command. The front seat may be configured to retract along the at least one rail in a forward direction such that the front seat is in an initial position when an end to an autonomous driving mode is expected or upon detection of a user initiated command.

It should be appreciated that an expected end to an autonomous driving mode may comprise leave a certified autonomous driving road or zone or the detection of an imminent crash in which a driver is required to take control of the car.

The description of the example embodiments provided herein has been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for seat retraction in a vehicle during an autonomous driving mode, the method comprising:
   detecting a user initiated command to perform seat retraction;
      automatically retracting a front seat in a rearward direction in response to the user initiated command such that an occupant of the front seat is out of reach of at least one engaged driving control input device of the vehicle during an autonomous driving mode; and
      automatically returning the front seat in a forward direction to an initial position when an end to the autonomous driving mode is expected or upon detection of a user initiated command.

2. The method of claim 1 wherein the detecting further comprises detecting the user initiated command in a form of a position or movement of the occupant.

3. The method of claim 1 wherein the retracting further comprises retracting the front seat a distance according to an occupant provided profile and/or sensor data.

4. The method of claim 1 wherein the retracting further comprises retracting the front seat at a varying speed profile.

5. The method of claim 1 further comprising maintaining the at least one driving control input device in a state in which the at least one driving control input device is configured to receive a driving input subsequent to the retracting of the front seat that overrides the autonomous driving mode of the vehicle.

6. The method of claim 1 wherein retracting the front seat in the rearward direction comprises sliding the front seat along at least one rail connected to a floor of the vehicle so that the front seat is out of reach of the at least one engaged driving control input device during the autonomous driving mode.

7. The method of claim 6 wherein the at least one engaged driving control input device comprises a foot pedal.

8. A seat assembly for retracting a front seat in a vehicle during an autonomous driving mode, the seat assembly comprising:
   a control unit configured to detect a user initiated command to perform seat retraction; and
   a front seat controllable by the control unit and configured to slide along at least one rail, the at least one rail being connectable to a floor surface of the vehicle, wherein the front seat is configured to automatically retract in a rearward direction along the at least one rail in response to the user initiated command such that an occupant of the front seat is out of reach of at least one driving control input device of the vehicle during an autonomous driving mode when the at least one driving control input device is engaged, and wherein the front seat is configured to automatically return in a forward direction to an initial position when an end to the autonomous driving mode is expected or upon detection of a user initiated command.

9. The seat assembly of claim 8 wherein the control unit is further configured to detect the user initiated command in a form of a position or movement of the occupant.

10. The seat assembly of claim 8 wherein the front seat is further configured to retract a distance according to an occupant provided profile and/or sensor data.

11. The seat assembly of claim 8 further comprising an actuator configured to control the retraction of the front seat at a varying speed profile.

12. The seat assembly of claim 8 wherein the front seat is further configured to move along the at least one rail in a forward direction to an initial position when an end to an autonomous driving mode is expected or upon detection of a user initiated command.

13. The seat assembly of claim 8 wherein the control unit is further configured to maintain the at least one driving control input device in a state in which the at least one driving control input device is configured to receive a driving input subsequent to the retraction of the front seat that overrides the autonomous driving mode of the vehicle.

14. A vehicle comprising the seat assembly of claim 8.

15. A non-transitory computer readable medium comprising stored program instructions for seat retraction in a vehicle during an autonomous driving mode, the program instructions for execution by one or more processors to carry out steps of:
   detecting a user initiated command to perform seat retraction;
   automatically retracting a front seat in a rearward direction in response to the user initiated command such that an occupant of the front seat is out of reach of a steering wheel and foot pedals of the vehicle during an autonomous driving mode when the steering wheel and foot pedals are engaged; and
   automatically returning the front seat in a forward direction to an initial position when an end to an autonomous driving mode is expected or upon detection of a user initiated command.

16. The computer readable medium of claim 15 further comprising executable instructions for causing the one or more processors to carry out the detecting such that the detecting further comprises detecting the user initiated command in a form of a position or movement of the occupant.

17. The computer readable medium of claim 15 further comprising executable instructions for causing the one or more processors to carry out the retracting such that the retracting further comprises retracting the front seat a distance according to an occupant provided profile and/or sensor data.

18. The computer readable medium of claim 15 further comprising executable instructions for causing the one or more processors to carry out the retracting such that the retracting further comprises retracting the front seat at a varying speed profile.

19. The computer readable medium of claim 15 further comprising executable instructions for causing the one or more processors to carry out a step of maintaining the at least one driving control input device in a state in which the at least one driving control input device is configured to receive a driving input subsequent to the retracting of the front seat that overrides the autonomous driving mode of the vehicle.

\* \* \* \* \*